Patented Oct. 25, 1932

1,884,885

UNITED STATES PATENT OFFICE

LORIN B. SEBRELL AND ALBERT M. CLIFFORD, OF AKRON, OHIO, ASSIGNORS TO THE GOODYEAR TIRE & RUBBER COMPANY, OF AKRON, OHIO, A CORPORATION OF OHIO

ANTIOXIDANT OR AGE RETARDER FOR RUBBER COMPOUNDS

No Drawing.  Application filed January 4, 1930.  Serial No. 418,646.

This invention relates to the treatment of rubber compounds. More particularly it pertains to a method of increasing the age resisting characteristics of such compounds. One of the objects of the invention is to provide a method of enhancing the age retarding characteristics of certain antioxidants or age retarders heretofore employed in rubber compounds.

It is now well understood that certain organic compounds, e. g. hydro quinone, diphenyl amine, ditolyl amine and some derivatives of aromatic amines and aldehydes, when incorporated into rubber, act as inhibitors of oxidation and are, for that reason, termed "antioxidants" or "age-retarders". Although many materials heretofore employed have been fairly satisfactory at comparatively low temperatures, most of them have not been so effective as desired at such high temperatures as encountered in hose employed to carry hot water, or in pneumatic truck tires and tubes.

This invention resides in the discovery of a method of enhancing the age retarding properties of certain antioxidants by incorporating therein a material which may be termed an "adjuvant". The invention is particularly applicable in connection with the class of thio diaryl amines of the type represented by the formula

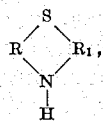

in which R and R₁ are aryl groups. Although the above designated amines are inherently among the most powerful antioxidants at the temperatures to which rubber compounds are ordinarily exposed, it is now found that their age retarding properties are materially improved by incorporating therein a quantity of almost any of the ordinary substances which inherently exhibit age retarding characteristics when introduced into rubber. Even though the compound added exhibits only slight or very mild properties as an antioxidant when employed by itself, the addition thereof to thio diaryl amines results in an age retarder compound more satisfactory than the powerful thio diaryl amines themselves. The following are a few of the secondary thio amines which may be employed in practicing the invention: thio phenyl beta naphthylamine, thio phenyl alpha naphthylamine, thio para tolyl alpha or beta naphthylamine, thio xylyl alpha or beta naphthylamine, thio alpha beta dinaphthylamine, thio beta beta dinaphthylamine, thio alpha alpha dinaphthylamine, thio diphenyl amine, thio ditolyl amine, thio dixylyl amine, thio phenyl tolyl amine, thio phenyl xylyl amine, thio tolyl xylyl amine and similar compounds. Any or all of the above described thio compounds may be intermixed with most, if not all, of the antioxidants now known to the rubber industry to produce materials offering extremely high resistance to deterioration.

The following are a few of the materials which may be so intermixed with excellent results: amino acenaphthene, phenyl alpha and phenyl beta naphthyl nitrosamine, para tolyl alpha and para tolyl beta naphthyl nitrosamine, xylyl alpha and xylyl beta naphthyl nitrosamine, di-xylyl nitrosamine, di-tolyl nitrosamine (either ortho, meta or para), phenyl tolyl nitrosamine (ortho, meta or para), phenyl xylyl nitrosamine, diphenyl nitrosamine, beta-beta dinaphthyl nitrosamine, alpha alpha dinaphthyl nitrosamine, alpha beta dinaphthyl nitrosamine, benzyl phenyl nitrosamine, carbazole nitrosamine, diethyl nitrosamine, diperidyl nitrosamine, methyl phenyl nitrosamine, phenyl beta naphthylamine, phenyl alpha naphthylamine, alpha alpha, alpha beta or beta beta dinaphthyl amine, tolyl and xylyl naphthylamines (of both alpha and beta form), alpha methylene bis (beta) phenyl amine naphthalene having the formula

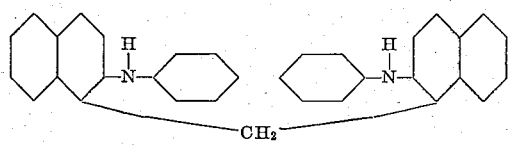

beta beta dinaphthol, methylene di-beta naphthol, chlor beta naphthol, symmetrical di-beta naphthyl para phenylene diamine, symmetrical di-beta naphthyl ethylene diamine, diamino di-ortho tolyl methane and its homologues, dinaphthyl formamidine, s. di-ortho tolyl ethylene diamine, aniline hydroquinone addition products, notably that compound having a melting point of 92° to 93° C., 2-4-diamino phenyl beta naphthyl ether, diamino diphenylene oxide, Bis (para hydroxy phenyl) ethylene glycol ether, para para' di-hydroxy diphenyl amine, diphenyl para phenylene diamine, para hydroxy diphenyl amine, x-amino para hydroxy diphenyl of the formula

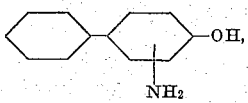

m-tolylene diamine, 2-4-diamino diphenyl amine, amino fluorene, amino alpha methyl naphthalene, amino beta methyl naphthalene, diamino carbazole, tri-beta naphthylamine, diamino tri phenyl methane, dialpha naphthyl formamidine, butyl alpha and beta naphthylamine, naphthylamino benzyl alcohol, diphenyl ethylene diamine, 2-4-diamino diphenyl methane, diphenyl amine, ditolyl amine, naphthols (either alpha or beta), alpha and beta naphthylamines, Schiff's bases formed by the interaction of aldehydes and amines of acid media, e. g., the reaction product of acetaldehyde and naphthylamine, butyl aldehyde or croton aldehyde and naphthylamine, dithio amines, e. g., dithio phenyl beta naphthylamine, dithio di-beta naphthylamine, etc.

The thio amines previously described may conveniently be prepared by subjecting molecular proportions of a diaryl amine, e. g. phenyl beta naphthylamine, to the action of 2 atoms of sulphur in an open vessel at a temperature of about 180° C. and in the presence of approximately one half of one per cent of iodine. This procedure is accompanied by vigorous evolution of hydrogen sulphide, which evolution usually is completed in about fifteen minutes. Completion of the evolution also marks completion of the reaction. The resultant product, upon cooling, is obtained as a hard cake which, for purposes of purification, may be ground and dissolved in such suitable solvent as ordinary alcohol. Precipitation of the purified product is effected by pouring the alcoholic solution into water containing alcohol in which the amines are insoluble. The insoluble material constituting practically pure thio substituted diaryl amine may be separated from the liquid by permitting it to settle and then subjecting the whole to filtration. Further purification may be accomplished by recrystallization from a benzene-ligroin solution. The thio amines thus prepared may be mixed with any of the compounds employed as adjuvants by the simple process of milling the two compounds together by means of any convenient instrumentality. These mixtures may be employed as antioxidants in most of the standard rubber formulae in which various accelerators, such as diphenyl guanidine, mercaptobenzothiazole, hexamethylene tetramine and reaction products of aldehydes and amines, e. g., croton aldehyde and aniline are employed. The following formula has been found by experience to be highly satisfactory when any of the previously described antioxidant materials are employed in connection therewith:

|  | Parts |
|---|---|
| Smoked sheet rubber | 100 |
| Zinc oxide | 92.5 |
| Carbon black | .6 |
| Stearic acid | .7 |
| Sulphur | 3.5 |
| Diphenylguanidine | .7 |
| Antioxidant | 5 |

Samples for each of the mixtures of antioxidants were prepared in duplicate and were then subjected to cure for varying periods of time at a temperature of 285° F. Upon the completion of the cure, one set of the samples was subjected immediately to physical tests to ascertain the tensile strength and elasticity thereof prior to aging. The remaining samples were subjected to a period of artificial aging which consisted in introducing them into an air bomb for a period of 7 hours at a temperature of 114° C. at a pressure of 80 pounds per square inch. At the conclusion of artificial aging, they were subjected to physical tests identical to those conducted in connection with the unaged samples. The results of these tests together with corresponding results obtained by testing samples of the various components of certain of the mixtures as controls are set forth in tables below.

In the tables, the data under the term "Modulus" refers to the load in kgs per square centimeter at 300 and 500 per cent elongation. The term "Tens." refers to the ultimate tensile strength in kgs per square centimeter and the term "Elong." indicates ultimate elongation in per cent.

1,884,885

Compound #I
*Thio phenyl alpha naphthylamine*

| Cure Mins. | Original Modulus 300% kgs/cm² | Modulus 500% kgs/cm² | Tens. kgs/cm² | Elong. | Aged Modulus 300% kgs/cm² | Modulus 500% kgs/cm² | Tens. | Elong. |
|---|---|---|---|---|---|---|---|---|
| 35 | 23 | 68 | 134 | 645 | 39 | 96 | 118 | 560 |
| 50 | 32 | 92 | 181 | 655 | 59 | 113 | 126 | 530 |
| 70 | 44 | 124 | 224 | 640 | 58 | --- | 102 | 445 |

Compound #II
*Thio phenyl beta naphthylamine*

| 35 | 31 | 88 | 190 | 690 | 32 | 81 | 119 | 600 |
|---|---|---|---|---|---|---|---|---|
| 50 | 45 | 125 | 229 | 645 | 44 | 106 | 158 | 615 |
| 70 | 56 | 147 | 238 | 625 | 59 | 131 | 143 | 525 |

Compound #III
*Thio diphenyl amine*

| 35 | 30 | 83 | 116 | 575 | 35 | 93 | 122 | 570 |
|---|---|---|---|---|---|---|---|---|
| 50 | 39 | 110 | 148 | 565 | 43 | 108 | 149 | 585 |
| 70 | 47 | 128 | 198 | 610 | 55 | 130 | 160 | 560 |

Compound #IV
*Thio beta beta dinaphthylamine*

| 35 | 43 | 126 | 228 | 655 | 37 | 86 | 135 | 625 |
|---|---|---|---|---|---|---|---|---|
| 50 | 52 | 142 | 235 | 625 | 42 | 96 | 138 | 595 |
| 70 | 60 | 159 | 232 | 600 | 56 | 119 | 144 | 560 |

*Diamino diphenylene oxide*

| 35 | 37 | 105 | 182 | 630 | 44 | 100 | 102 | 505 |
|---|---|---|---|---|---|---|---|---|
| 50 | 41 | 115 | 200 | 635 | 52 | 115 | 120 | 510 |
| 70 | 46 | 125 | 230 | 650 | 64 | --- | 110 | 435 |

*Diamino diphenylene oxide 20%*
*Compound #I 80%*

| 35 | 39 | 136 | 196 | 650 | 55 | 127 | 174 | 590 |
|---|---|---|---|---|---|---|---|---|
| 50 | 45 | 138 | 220 | 620 | 65 | 148 | 172 | 545 |
| 70 | 48 | 150 | 229 | 610 | 80 | 164 | 178 | 525 |

*S. di beta naphthyl ethylene diamine*

| 35 | 37 | 107 | 167 | 600 | 17 | 42 | 60 | 590 |
|---|---|---|---|---|---|---|---|---|
| 50 | 37 | 112 | 196 | 635 | 21 | 52 | 75 | 600 |
| 70 | 47 | 136 | 220 | 615 | 28 | 69 | 86 | 550 |

*S. di beta naphthyl ethylene diamine 20%*
*Compound #I 80%*

| 35 | 29 | 82 | 170 | 675 | 44 | 108 | 162 | 610 |
|---|---|---|---|---|---|---|---|---|
| 50 | 39 | 107 | 209 | 660 | 51 | 120 | 172 | 605 |
| 70 | 49 | 128 | 222 | 640 | 59 | 132 | 142 | 525 |

*Diamino di-o-tolyl methane*

| 35 | 39 | 112 | 179 | 615 | 47 | --- | 100 | 480 |
|---|---|---|---|---|---|---|---|---|
| 50 | 43 | 120 | 202 | 625 | 56 | --- | 104 | 450 |
| 70 | 48 | 131 | 201 | 600 | 66 | --- | 84 | 365 |

*Diamino di-o-tolyl methane 20%*
*Compound #II 80%*

| 35 | 32 | 94 | 164 | 630 | 52 | 128 | 178 | 590 |
|---|---|---|---|---|---|---|---|---|
| 50 | 42 | 117 | 194 | 625 | 62 | 150 | 175 | 550 |
| 70 | 51 | 137 | 208 | 605 | 76 | --- | 152 | 470 |

*Di beta naphthyl-p-phenylene diamine*

| 35 | 29 | 84 | 136 | 620 | 15 | --- | 38 | 490 |
|---|---|---|---|---|---|---|---|---|
| 50 | 34 | 101 | 172 | 630 | 19 | 47 | 60 | 555 |
| 70 | 41 | 111 | 205 | 645 | 28 | --- | 58 | 465 |

*Di beta naphthyl p phenylene diamine 20%*
*Compound #II 80%*

| 35 | 28 | 80 | 163 | 670 | 37 | 95 | 150 | 615 |
|---|---|---|---|---|---|---|---|---|
| 50 | 38 | 106 | 193 | 645 | 48 | 119 | 160 | 580 |
| 70 | 43 | 120 | 214 | 645 | 57 | 135 | 164 | 555 |

*Di alpha naphthyl formamidine*

| 35 | 35 | 94 | 125 | 595 | 15 | --- | 25 | 415 |
|---|---|---|---|---|---|---|---|---|
| 50 | 41 | 113 | 180 | 615 | 24 | --- | 40 | 410 |
| 70 | 51 | 134 | 205 | 605 | --- | --- | 45 | 385 |

*Di alpha naphthyl formamidine 20%*
*Compound #II 80%*

| 35 | 29 | 84 | 152 | 640 | 37 | 95 | 148 | 605 |
|---|---|---|---|---|---|---|---|---|
| 50 | 37 | 104 | 196 | 650 | 50 | 122 | 168 | 585 |
| 70 | 46 | 127 | 196 | 600 | 58 | 136 | 166 | 555 |

*Aniline hydroquinone—(m.p.93) 20%*
*Compound #II 80%*

| 35 | 30 | 88 | 169 | 645 | 42 | 109 | 164 | 600 |
|---|---|---|---|---|---|---|---|---|
| 50 | 39 | 111 | 186 | 625 | 51 | 128 | 172 | 585 |
| 70 | 46 | 124 | 194 | 620 | 63 | 150 | 186 | 565 |

*S. di beta naphthyl ethylene diamine 20%*
*Compound #II 80%*

| 35 | 32 | 95 | 178 | 650 | 45 | 117 | 180 | 605 |
|---|---|---|---|---|---|---|---|---|
| 50 | 38 | 107 | 200 | 645 | 47 | 119 | 192 | 630 |
| 70 | 48 | 129 | 216 | 625 | 60 | 146 | 150 | 510 |

*3-6-diamino carbazole*

| 35 | 36 | 107 | 174 | 625 | 42 | --- | 100 | 450 |
|---|---|---|---|---|---|---|---|---|
| 50 | 43 | 120 | 186 | 605 | 48 | --- | 98 | 420 |
| 70 | 49 | 135 | 194 | 580 | 53 | --- | 100 | 410 |

*3-6-Diamino carbazole 20%*
*Compound #II 80%*

| 35 | 33 | 96 | 164 | 625 | 38 | 96 | 148 | 615 |
|---|---|---|---|---|---|---|---|---|
| 50 | 44 | 125 | 190 | 600 | 48 | 105 | 159 | 595 |
| 70 | 49 | 135 | 192 | 585 | 56 | 125 | 158 | 570 |

*2-4 Diamino phenyl beta naphthyl ether*

| 35 | 22 | 70 | 140 | 655 | 33 | 87 | 96 | 525 |
|---|---|---|---|---|---|---|---|---|
| 50 | 29 | 87 | 160 | 640 | 43 | 106 | 112 | 515 |
| 70 | 34 | 100 | 168 | 615 | 51 | --- | 102 | 450 |

*2-4-Diamino phenyl beta naphthyl ether 20%*
*Compound #II 80%*

| 35 | 27 | 78 | 148 | 640 | 34 | 88 | 120 | 575 |
|---|---|---|---|---|---|---|---|---|
| 50 | 34 | 100 | 190 | 645 | 46 | 113 | 163 | 595 |
| 70 | 35 | 119 | 218 | 625 | 59 | 136 | 164 | 560 |

*S-Amino acenaphthene*

| 35 | 21 | 64 | 140 | 665 | 20 | 54 | 70 | 565 |
|---|---|---|---|---|---|---|---|---|
| 50 | 32 | 95 | 200 | 665 | 32 | 80 | 120 | 610 |
| 70 | 44 | 124 | 220 | 635 | 43 | 100 | 132 | 575 |

Amino acenaphthene 20%
Compound #II 80%

| Cure Mins. | Original Modulus 300% kgs/cm² | Original Modulus 500% kgs/cm² | Tens. kgs/cm² | Elong. | Aged Modulus 300% kgs/cm² | Aged Modulus 500% kgs/cm² | Tens. | Elong. |
|---|---|---|---|---|---|---|---|---|
| 35 | 28 | 79 | 148 | 640 | 40 | 106 | 160 | 600 |
| 50 | 37 | 105 | 196 | 645 | 50 | 128 | 180 | 595 |
| 70 | 49 | 133 | 198 | 595 | 64 | 150 | 150 | 500 |

S. di beta naphthyl p phenylene diamine 20%
Compound #III 80%

| 35 | 30 | 80 | 154 | 660 | 37 | 100 | 177 | 660 |
|---|---|---|---|---|---|---|---|---|
| 50 | 37 | 103 | 176 | 630 | 46 | 120 | 208 | 650 |
| 70 | 46 | 122 | 202 | 625 | 59 | 144 | 200 | 600 |

Amino acenaphthene 20%
Compound #III 80%

| 35 | 33 | 94 | 170 | 640 | 44 | 118 | 208 | 645 |
|---|---|---|---|---|---|---|---|---|
| 50 | 39 | 108 | 196 | 650 | 54 | 139 | 230 | 640 |
| 70 | 49 | 130 | 214 | 625 | 68 | 162 | 218 | 585 |

S. di beta naphthylethylene diamine 20%
Compound #III 80%

| 35 | 29 | 85 | 158 | 655 | 37 | 97 | 172 | 650 |
|---|---|---|---|---|---|---|---|---|
| 50 | 39 | 107 | 188 | 640 | 48 | 118 | 190 | 625 |
| 70 | 47 | 124 | 202 | 620 | 55 | 133 | 190 | 610 |

Phenyl beta naphthyl nitrosamine 20%
Compound #III 80%

| 35 | 28 | 79 | 145 | 650 | 33 | 85 | 138 | 650 |
|---|---|---|---|---|---|---|---|---|
| 50 | 34 | 92 | 160 | 630 | 40 | 100 | 170 | 635 |
| 70 | 44 | 115 | 200 | 645 | 52 | 124 | 176 | 605 |

Amino acenaphthene 20%
Compound #IV 80%

| 35 | 39 | 106 | 204 | 670 | 48 | 122 | 209 | 650 |
|---|---|---|---|---|---|---|---|---|
| 50 | 50 | 132 | 219 | 630 | 63 | 148 | 188 | 570 |
| 70 | 58 | 146 | 224 | 610 | 72 | 158 | 188 | 555 |

4,4' Diamino di o tolyl methane 20%
Compound #IV 80%

| 35 | 40 | 113 | 214 | 650 | 57 | 148 | 202 | 610 |
|---|---|---|---|---|---|---|---|---|
| 50 | 50 | 135 | 218 | 625 | 72 | 158 | 182 | 540 |
| 70 | 57 | 150 | 208 | 685 | 83 | --- | 152 | 470 |

S. di o tolyl ethylene diamine 20%
Compound #IV 80%

| 35 | 37 | 108 | 210 | 665 | 40 | 97 | 154 | 645 |
|---|---|---|---|---|---|---|---|---|
| 50 | 47 | 126 | 218 | 645 | 50 | 118 | 164 | 590 |
| 70 | 54 | 140 | 220 | 615 | 60 | 130 | 156 | 570 |

By comparison of the results obtained by testing certain of the components of the previously described mixtures with the results obtained by testing the mixtures thereof, it will be observed that materially higher resistance to aging is obtained from the mixtures of the components than from either of the components alone.

The results obtained by testing thio diphenyl amine and amino acenaphthene separately and as mixtures constitute excellent illustrations of this fact. Mixtures containing thio diphenyl amine and amino acenaphthene when cured for fifty minutes and aged under the conditions specified exhibit a tensile strength of 230 kgs per square centimeter, whereas the use of thio diphenyl amine alone under like conditions results in a product having a tensile strength of 149 kgs per square centimeter. The product containing amino acenaphthene exhibits a tensile strength of only 120 kgs per square centimeter. The product containing the mixture is thus shown to be 54 percent higher in tensile strength than products containing a single component. Of course, not all mixtures are as effective as this particular example. However, addition of most of the ordinary antioxidants to thio amines gives improved results. This is particularly true in those cases where one component of the mixture is a naphthyl compound while the other contains only benzene nuclei or derivatives thereof as substituents.

The action of these ordinary antioxidants as adjuvants for the thio compounds is quite remarkable inasmuch as the thio compounds are in themselves powerful age retarders under all ordinary conditions and are particularly efficient when employed as antioxidants in compounds exposed to high temperatures. This is particularly notable when it is considered that many of the compounds employed in admixture with the thio compounds are only mildly antioxidant in properties, and in few cases are they equal to the thio compounds to which they are added.

Although only the preferred forms of the invention have been described, it will be apparent to those skilled in the art that the invention is not so limited but that various modifications may be made therein without departing from the spirit of the invention or from the scope of the appended claims.

What is claimed is:

1. A method of preserving rubber which comprises incorporating therein a mixture of a thio diaryl substituted amine and an organic compound which exhibits age retarding properties but which is excluded from the class of thio diaryl amines.

2. A method of preserving rubber which comprises subjecting it to vulcanization in the presence of a mixture of a material having the formula

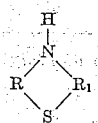

in which R and $R_1$ are aryl groups and a material which is excluded from the class and which of itself exhibits some powers as an antioxidant or age inhibitor for rubber compounds.

3. A method of treating rubber which comprises vulcanizing it in the presence of a thio diaryl amine and an aryl amine which is a preservative of rubber but which is a non-accelerator of vulcanization, one of the components of the mixture being a naphthyl compound while the other contains only six sided nuclei of benzenoid type.

4. A method of preserving rubber which comprises subjecting it to vulcanization in the presence of a mixture of a material having the following structural formula

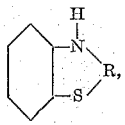

in which R represents a radical selected from a group consisting of naphthalene and benzene, and an antioxidant which is excluded from that class and which is substantially a non-accelerator of vulcanization.

5. A method of preserving rubber which comprises incorporating therein a mixture of a material having the formula

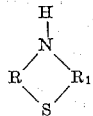

in which R and $R_1$ comprise benzene nuclei and a material which is excluded from that class and which inherently exhibits at least slight powers as an antioxidant or age retarder when incorporated in rubber but which is substantially a non-accelerator of vulcanization.

6. A method of treating rubber which comprises subjecting it to vulcanization in the presence of a material which has the formula

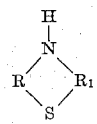

in which R is a naphthyl group and $R_1$ is a benzene group intermixed with a material which is excluded from that class and which inherently possesses at least slight powers as an antioxidant or age retarder in rubber compounds, but which is substantially a non-accelerator of vulcanization.

7. A method of preserving rubber which comprises subjecting it to vulcanization in the presence of a secondary thio aryl amine and an aryl di amine.

8. A method of preserving rubber which comprises subjecting it to vulcanization in the presence of a mixture of thio naphthylamine and an aryl amine which is an antioxidant.

9. A method of preserving rubber which comprises subjecting it to vulcanization in the presence of a mixture of a thio diaryl amine containing a naphthyl group and a secondary aromatic amine which is excluded from that class.

10. A method of preserving rubber which comprises subjecting it to vulcanization in the presence of a secondary thio naphthyl amine and an aryl di amine.

11. A method of treating rubber which comprises vulcanizing it in the presence of a mixture of thio diphenyl amine and symmetrical di beta naphthyl ethylene diamine.

12. A method of treating rubber which comprises vulcanizing it in the presence of a mixture of thio diphenyl amine and phenyl beta naphthyl nitrosamine.

13. A method of treating rubber which comprises vulcanizing it in the presence of a mixture of thio diphenyl amine and amino acenaphthene.

14. A rubber material which has been vulcanized in the presence of a mixture of a thio diaryl substituted amine and a material which is substantially a non-accelerator of vulcanization which inherently exhibits at least slight powers as an antioxidant or age retarder for the rubber compound but which belongs to a different class from the first mentioned material.

15. A rubber product which has been vulcanized in the presence of a mixture of a material having the following formula

and a material belonging to another class which exhibits some power as an antioxidant or age retarder for rubber compounds but which is substantially a non-accelerator of vulcanization.

16. A rubber product that has been vulcanized in the presence of a mixture of a secondary thio naphthyl amine and a material having the formula $H_2N$-$RNH_2$.

17. A rubber product that has been vulcanized in the presence of a mixture of thio diaryl naphthylamine and a secondary aromatic amine of another class which is a non-accelerating antioxidant.

18. A rubber product that has been vulcanized in the presence of a mixture of thio diaryl substituted amine and an antioxidant amine of another class which is a non-accelerator of vulcanization.

19. A rubber product that has been vulcanized in the presence of a mixture of thio dinaphthylamine and an aryl diamine.

20. A rubber product that has been vulcanized in the presence of a mixture of thio phenyl naphthylamine and 3-amino acenaphthene.

21. A substantially non-accelerating antioxidant consisting of a mixture of a thio diaryl substituted amine and a material of another class which, of itself, exhibits at least a slight power as an antioxidant or age retarder when incorporated in rubber but which is substantially a non-accelerator of vulcanization.

22. A method of preserving rubber which comprises subjecting it to vulcanization in the presence of a mixture of an amine having the formula

where R and $R_1$ are aryl groups and an amine which is an antioxidant.

23. A method of preserving rubber which comprises subjecting it to vulcanization in the presence of the material having the formula

in which R and $R_1$ are aryl groups and a secondary amine.

24. A method of preserving rubber which comprises subjecting it to vulcanization in the presence of a mixture of the material having the formula

in which R and $R_1$ are aryl groups and an antioxidant material selected from a class comprising primary and secondary amines.

25. A method of preserving rubber which comprises subjecting it to vulcanization in the presence of a mixture of a material having the formula

in which R and $R_1$ are members of the benzene series and an age retarding amine.

26. A method of preserving rubber which comprises subjecting it to vulcanization in the presence of a mixture of a material having the formula

in which R and $R_1$ are aryl groups and an amine selected from a class comprising primary and secondary amines.

In witness whereof, we have hereunto signed our names.

Signed at Akron, in the county of Summit and State of Ohio, this 3rd day of January, 1930.

LORIN B. SEBRELL.
    ALBERT M. CLIFFORD.